United States Patent [19]

Wolf

[11] 4,202,305

[45] May 13, 1980

[54] CAPACITOR DISCHARGE IGNITION SYSTEM WITH TIMING STABILIZATION ARRANGEMENT

[75] Inventor: Ronald J. Wolf, Zanesville, Ind.

[73] Assignee: Wabash, Inc., Wabash, Ind.

[21] Appl. No.: 927,773

[22] Filed: Jul. 25, 1978

[51] Int. Cl.² ............................................. F02P 3/06
[52] U.S. Cl. ........................... 123/148 CC; 123/149 C; 123/149 D; 310/70 A; 315/209 CD; 315/218
[58] Field of Search ........ 123/148 CC, 149 A, 149 C, 123/117 R, 149 D; 310/70 R, 70 A; 315/209 CD, 218

[56] References Cited

U.S. PATENT DOCUMENTS

| | | | |
|---|---|---|---|
| 3,722,488 | 3/1973 | Swift et al. | 123/148 CC |
| 3,861,373 | 1/1975 | Allwang et al. | 123/148 CC |
| 4,036,201 | 7/1977 | Burson | 123/148 CC |
| 4,056,088 | 11/1977 | Carmichael | 123/148 E |
| 4,108,131 | 8/1978 | Shibukawa | 123/148 CC |
| 4,120,277 | 10/1978 | Ehlen | 123/117 R |

*Primary Examiner*—Charles J. Myhre
*Assistant Examiner*—Andrew M. Dolinar
*Attorney, Agent, or Firm*—Mason, Kolehmainen, Rathburn & Wyss

[57] ABSTRACT

A capacitor discharge ignition system is provided with an ignition timing stabilization arrangement to achieve substantially constant ignition timing characteristics over a wide range of engine speeds. The capacitor discharge ignition system is positioned adjacent a rotating permanent magnet that is rotated over a path in synchronism with the operation of an engine to be controlled.

The capacitor discharge ignition system includes a stator core having disposed thereon an ignition coil and a control coil assembly. The control coil assembly includes a control winding and a timing stabilization winding. As a first pole of the magnet passes the stator core, a voltage and current of a first polarity is induced in the control winding to charge a storage capacitor. As the second pole of the magnet passes the stator core, a voltage and current of the opposite polarity is induced in the control winding and a control arrangement responsive to the control winding discharges the capacitor into a primary winding of the ignition coil. The induced voltage and current in a secondary winding of the ignition coil provides suitable power conditions to fire a spark plug or spark plugs connected across the secondary windings. In one arrangement, the timing stabilization winding is connected in series with the control winding during the passage of the second magnet pole to provide a stable ignition timing control signal to the control arrangement of the capacitor discharge ignition system.

6 Claims, 6 Drawing Figures

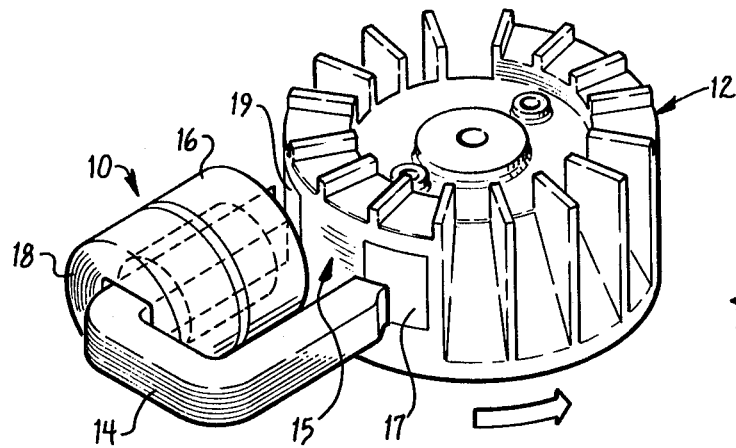
Fig 1
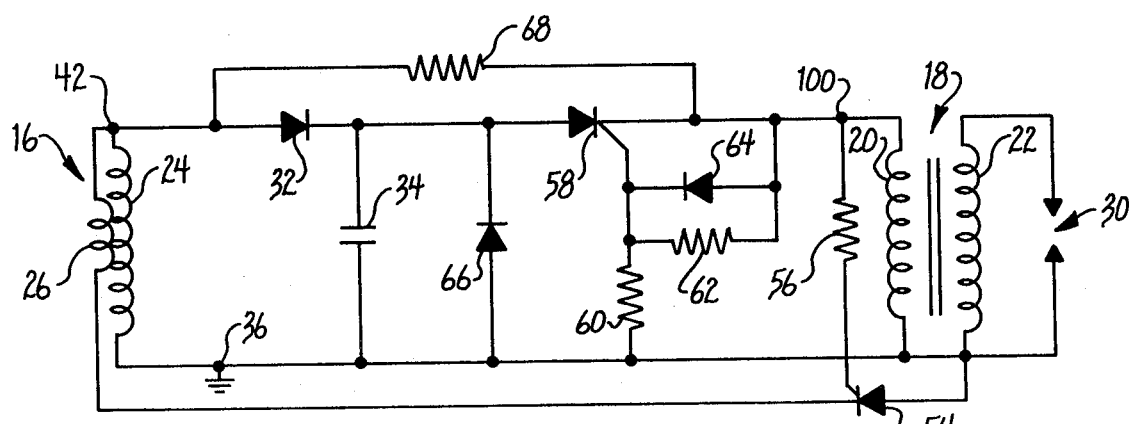
Fig 2
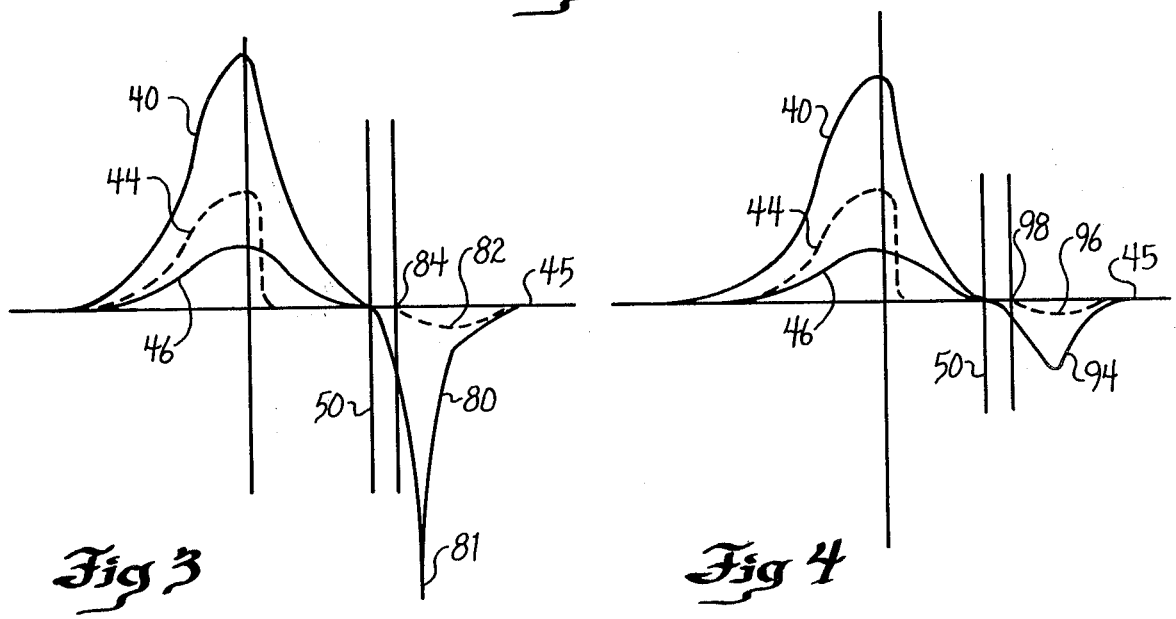
Fig 3
Fig 4

CAPACITOR DISCHARGE IGNITION SYSTEM WITH TIMING STABILIZATION ARRANGEMENT

BACKGROUND OF THE INVENTION

A. Field of the Invention

This invention relates generally to capacitor discharge ignition systems and more particularly to a compensation circuit for the stabilization of timing control.

B. Description of the Prior Art

Various capacitor discharge systems of the prior art have been developed to provide a breakerless ignition system for the control of an engine whereby an appropriately timed signal is supplied to the primary winding of an ignition coil to induce a high voltage in a secondary winding of the ignition coil to fire a spark plug or spark plugs associated with the engine.

The capacitor discharge systems of the prior art utilize various circuit arrangements and coil arrangements including triggering and charging coils in combination with a rotating permanent magnet on the engine flywheel to induce current in a charging coil, charge a capacitor with the induced current and discharge the capacitor into the primary winding of an ignition coil. Such arrangements are shown for example in U.S. Pat. No. 3,941,111 which issued to T. F. Carmichael on Mar. 2, 1976; U.S. Pat. No. 4,056,088 which issued to T. F. Carmichael on Nov. 1, 1977; U.S. Pat. No. 4,036,201 which issued to B. O. Burson on July 19, 1977; U.S. Pat. No. 3,500,809 which issued to G. Hohne on Mar. 17, 1970; U.S. Pat. No. 3,851,636 which issued to F. H. Just et al on Dec. 3, 1974; U.S. Pat. No. 3,703,889 which issued to B. Bodig et al on Nov. 28, 1972; U.S. Pat. No. 3,704,701 which issued to G. Streuber et al on Dec. 5, 1972; U.S. Pat. No. 3,484,677 which issued to M. J. Piteo on Dec. 16, 1969; and U.S. Pat. No. 3,722,488 which issued to T. E. Swift et al on Mar. 27, 1973.

The capacitor discharge ignition (CDI) systems of the prior art have also provided arrangements to advance the timing at higher engine speeds for improved engine performance and to provide proper ignition timing over a wide range of engine speeds to enable proper ignition at low RPM and to prevent excessve retarding of the engine timing or spark at very high engine RMP's.

For example in U.S. Pat. No. 3,941,111, a CDI system is disclosed wherein a capacitor is charged through a charge coil during a first portion of a pulse of one polarity and an SCR is triggered during a second portion of the same pulse to discharge the capacitor into the primary winding of an ignition coil. In FIG. 2 of this patent, the primary winding controls the SCR by means of a resistor-capacitor network. Specifically, a resistor 50 is connected between one end of a primary winding and the control gate electrode of the SCR and a capacitor is connected between the control electrode of the SCR and the other end of the primary winding. Further, an additional resistor 48 is connected across the capacitor 38 to prevent the spark from retarding at very high engine RPM.

In U.S. Pat. No. 4,056,088 and referring specifically to FIGS. 3 and 4, the CDI system disclosed therein provides an advance in ignition timing of approximately 8° to 10° at higher engine speeds. At column 5, lines 38 through 59, it is stated that the effect is highly desirable although the exact cause of the advance is not fully understood. The specification states that it is thought to be a part of the function of the spacing of the legs 22A and 22B of the stator core 22 relative to the spacing of the poles 18 and 20 of the permanent magnet structure carried by the flywheel.

In U.S. Pat. No. 3,500,809 there is disclosed a circuit arrangement to provide an automatic advancement of the timing or spark at higher engine speeds. This is accomplished by the control voltage to the SCR 7 rising faster with increased speed of the engine. A resistor-capacitor network or a shorting coil is provided to control this effect with varying engine speeds.

The automatic timing advance arrangement disclosed in U.S. Pat. No. 3,722,488 utilizes a trigger waveform including a first high speed trigger peak and a second low speed trigger peak. Specifically, the trigger waveform with two peaks is generated in a trigger coil; the trigger waveform including two distinct positive peaks with an appropriate timing relationship. The first trigger peak at low engine speeds is insufficient to trigger the control circuitry to discharge a charging capacitor. At low speeds the second, higher peak triggers the system at a point later in time and thus retarded with respect to the occurrence of the first peak. At high engine speeds, the first, lower level peak is sufficient to trigger the system and thus occurs at an advanced time with respect to the second peak. As the engine speed increases to a predetermined speed, the timing control is shifted from the second peak to the first peak with a resultant increase or advance in timing.

SUMMARY OF THE INVENTION

It is a principal object of the present invention to provide a new and improved capacitor discharge ignition system that stabilizes or compensates the timing of an engine over a wide range of engine speeds.

It is another object of the present invention to provide timing stabilization for a capacitor discharge ignition system which does not degrade the generation of the ignition voltage and that provides stabilization of ignition timing over the usable range of engine speeds.

BRIEF DESCRIPTION OF THE DRAWINGS

The invention both as to its organization and method of operation together with further objects and advantages thereof will best be understood by reference to the following specification taken in connection with the accompanying drawings in which:

FIG. 1 is a perspective view of the capacitor discharge ignition system of the present invention in operation adjacent a flywheel of an engine;

FIG. 2 is an electrical schematic diagram of the capacitor discharge ignition system of the present invention as shown in FIG. 1;

FIG. 3 is a graphical representation of the voltage and current waveforms present during the operation of the capacitor discharge ignition system of FIG. 2 without the provision of the timing stabilization arrangement of the present invention;

FIG. 4 is a graphical representation of the voltage and current waveforms present during the operation of the capacitor discharge ignition system of FIG. 2 with the provision of the timing stabilization arrangement of the present invention;

DESCRIPTION OF THE PREFERRED EMBODIMENT

Figure 5:
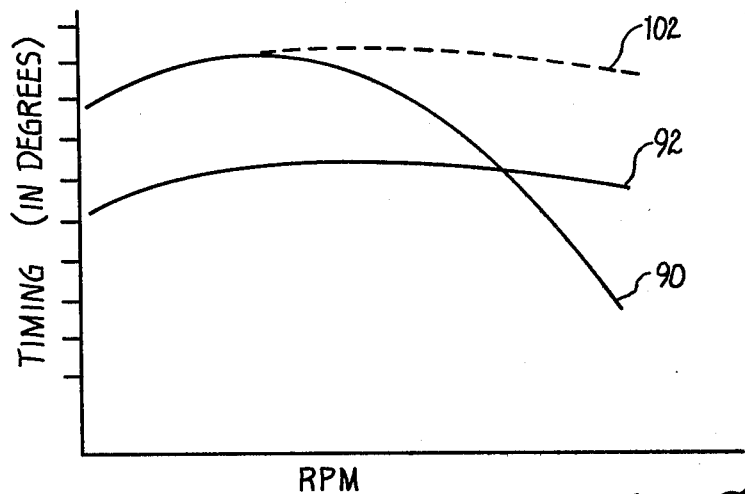
FIG. 5 is a graphical representation of the timing characteristics of the capacitive discharge ignition system of the present invention with respect to engine speed and illustrating the effect of the timing stabilization arrangement of the present invention.

Referring now to the drawings and more particularly to FIG. 1, the capacitor discharge ignition (CDI) system of the present invention referred to generally at 10 is shown in operative position adjacent a flywheel 12 of an engine. The flywheel 12 carries a permanent magnet referred to generally at 15 that energizes and controls the basic timing of the CDI system 10 upon rotation of the flywheel 12. The permanent magnet 15 includes two magnet pole faces or pieces 17 and 19. The CDI system 10 includes a generally U-shaped stator core 14. A control coil 16 and an ignition coil 18 are disposed on one leg of the stator core 14. Referring now additionally to FIG. 2, the ignition coil 18 includes a primary winding 20 and a secondary winding 22. In a specific embodiment, the primary winding 20 and the secondary winding 22 are concentrically arranged on the stator core 14 with the charge coil 16 disposed along the stator core 14 adjacent the ignition coil 18.

In accordance with an important aspect of the present invention the control coil assembly 16 includes a control winding 24 and a timing stabilization winding 26. In a preferred embodiment, the timing stabilization winding 26 is bifilar wound with the control winding 24. The stabilization winding 26 is operative during a predetermined portion of the overall operational cycle of the CDI system 10 to provide timing compensation and stabilization as will be explained in detail hereinafter.

The ignition coil 18 of the CDI system 10 of the present invention is arranged to fire a spark plug generally indicated at 30 and connected across the secondary winding 22. It should also be understood that the secondary winding 22 in other arrangements is connected to a plurality of spark plugs through an appropriate distributor system. The control winding 24 at one end referred to at reference point 42 is connected through a diode 32 anode to cathode to one end of a charging capacitor 34. The other end of the capacitor 34 and the other end of the control winding 24 are connected to a ground reference indicated generally at 36.

During operation of the CDI system 10 and referring now additionally to FIG. 4, as the leading magnet pole 17 of the permanent magnet 15 on the rotating flywheel 12 approaches the stator 14, a voltage is induced in the control winding 24 represented graphically by the waveform 40 of FIG. 4. The voltage waveform 40 is referenced to the coil end 42 of the control winding 24. A corresponding current represented by the waveform 44 of FIG. 4 flows through the diode 32 to charge the capacitor 34. As the leading magnet pole 17 leaves the proximity of the stator core 14, the induced voltage in the control winding 24 and the corresponding current flowing into the capacitor 34 will decrease as shown by the respective waveforms 40 and 44 in FIG. 4. Due to the presence of the diode 32, the charge on the capacitor 34 will be retained. As the leading magnet pole 17 moves past the stator core 14, a voltage will also be induced in the primary winding 20 of the ignition coil 18 as represented by the waveform 46 in FIG. 4.

The reference line 50 in FIG. 4 represents the respective points of the waveforms 40, 44 and 46 at the time of operation during rotation of the flywheel 12 as the leading magnet pole 17 passes away from the stator core 14 and before the arrival of the trailing magnet pole 19 of the permanent magnet 15. While the vertical axis or ordinate of the graphical representation of FIG. 4 represents the magnitude of the voltage or current of the respective waveforms 40, 44 and 46, the horizontal axis or abscissa 45 represents the angular rotation of the flywheel 12. As the trailing pole 19 of the permanent magnet approaches the stator core 14, the polarity of the induced voltage in the control winding 24 reverses and a voltage is induced of the opposite polarity with respect to the coil end 42 of the control winding 24. The waveforms of FIG. 3 represent operation of the CDI system 10 without the provision of the timing stabilization winding 26 of the present invention while the waveforms of FIG. 4 represent operation with the provision of the timing stabilization winding 26 of the present invention. Thus, the voltage and current waveforms 40, 44 and 46 of FIGS. 3 and 4 are substantially identical up to the reference line 50.

In accordance with important aspects of the present invention, one and of the timing stabilization winding 26 is connected to the coil end 42 of the control winding 24 and the other end of the timing stabilization winding 26 is connected to the cathode of a timing stabilization SCR 54. The anode of the timing stabilization SCR 54 is connected to the ground reference 36 and the gate or control electrode is connected through a resistor 56 to one end of the primary winding 20 identified at coil end reference point 100. The other end of the primary winding 20 is connected to the ground reference 36. The junction of the charging capacitor 34 and the cathode of diode 32 is connected to the anode of a discharging control SCR 58. The cathode of the SCR 58 is connected to the junction of the primary winding 20 and the resistor 56. The gate or control electrode of the discharging control SCR 58 is connected through a resistor 60 to the ground reference 36. The gate or control electrode of the SCR 58 is also connected through a resistor 62 to the cathode of the SCR 58. The resistors 60 and 62 provide a triggering network for the SCR 58. A protection diode 64 is connected anode to cathode between the cathode and gate of the SCR 58 to prevent excessive reverse breakdown voltages across the cathode to gate junction of the SCR 58. A limiting diode 66 is connected anode to cathode between the ground reference 36 and the anode of the SCR 58 to shunt high voltage ringing after discharge of the capacitor 34. A resistor 68 is connected between the coil end 42 of the control winding 24 and the cathode of the SCR 58 to provide a triggering path from the control winding 24 and the gate to cathode junction of the SCR 58 and also to control high voltage ringing after discharge of the capacitor 34.

Referring now to FIG. 3, and considering the operation of the CDI system 10 without the provision of the timing stabilization winding 26, as the trailing magnet pole 19 of the permanent magnet 15 passes the stator core 14, a voltage is induced in the control winding 24 as represented by the waveform 80. The induced voltage in the control winding 24 decreases sharply to a negative peak 81 as the trailing pole 19 is approximately positioned adjacent the stator core 14. As the trailing magnet pole 19 leaves the vicinity of the stator core 14, the induced voltage waveform 80 returns toward the base line 45. Thus, as the trailing magnet pole 19 moves through the vicinity of the stator core 14, a negative voltage is induced across the control winding 24 at the coil end 42 with respect to the reference potential 36, represented graphically by the base line axis 45. The charge capacitor 34 is isolated by the diode 32 and the charge across the capacitor 34 is maintained.

Accordingly, with the capacitor 34 isolated from the control winding 24, the remaining circuit is highly inductive and the resultant current flowing from the control winding 24 and represented by waveform 82 of FIG. 3 appreciably lags the voltage waveform 80. As the voltage represented by the waveform 80 is induced across the control winding 24, the resultant current represented by the waveform 82 flows through the series combination of the resistor 60, the gate to cathode junction of the SCR 58, and the resistor 68. The SCR 58 is triggered when the appropriate combination of triggering voltage and triggering current are simultaneously present across the gate to cathode junction of the SCR 58. Upon triggering of the SCR 58, the capacitor 34 is discharged into the primary winding 20 of the ignition coil 18. The discharge of the capacitor 34 that occurs through the primary winding 18 induces a high voltage pulse in the secondary winding 22 of the ignition coil 18 to provide the appropriate power conditions to fire the spark plug connected at 30 across the secondary winding 22.

The point of angular revolution of the flywheel 12 at which the triggering of the SCR 58 occurs is indicated by the reference line 84. Over wide ranges of engine speed or RPM, the triggering point 84 will occur at different angular positions of the flywheel 12 representing different positions of angular revolution along the base line axis 45. Correspondingly, the engine timing will also vary since engine timing is defined as the occurrence of the ignition spark relative to the angular position of the flywheel. This occurs due to the time lag produced by the phase difference between the current waveform 82 and the voltage waveform 80 of the control winding 24. For increasing engine RPM or flywheel speed, this results in an ignition spark retardation relative to the ignition timing at lower engine RPM.

Referring now to FIG. 5, the ignition timing in degrees is plotted along the vertical axis or ordinate and the engine speed or RPM is plotted along the horizontal axis or abscissa. The curve 90 represents the variation in ignition timing over a relatively wide range of engine speeds and illustrates significant timing retardation at increasing engine speed. The ignition timing retardation at higher engine speeds is a consequence of the later triggering of the SCR 58 as measured by angular revolution of the flywheel 12 due to the phase difference of the current waveform 82 with respect to the voltage waveform 80.

In accordance with important aspects of the present invention and referring to FIG. 4, the timing stabilization winding 26 is operative during the negative half cycle portion of the waveform resulting during the passage of the trailing pole 19. The timing stabilization winding 26 is effective to stabilize the ignition timing and the CDI system 10 as represented by the ignition timing curve 92 of FIG. 5. The CDI system 10 with the timing stabilization winding 26 provides ignition timing over a wide range of engine speeds that is essentially constant. The waveform 94 of FIG. 4 represents the voltage across the control winding 24 with the timing stabilization winding 26 of the present invention being operable to reduce the effective inductance of the control winding 24. The timing stabilization winding 26 loads the control winding 24 and reduces the voltage induced in the control winding 24. The resultant current in the control winding 24 is represented by the waveform 96. The current in the control winding 24 represented by the waveform 96 is much more nearly in phase with the voltage 94 as compared to the corresponding voltage and current of FIG. 3. The point at which the SCR 58 is triggered is represented by the reference line 98 in FIG. 4 and this trigger and the ignition timing point is stabilized over the range of engine speeds and occurs at substantially the same angular position of the flywheel 12. During the negative half cycle of voltage induced in the control winding 24 as represented by the waveform 94, the SCR 54 is controlled to place the timing stabilization coil 26 in series with the control winding 24.

In the arrangement of FIG. 2, the primary winding 20 and the control winding 24 are arranged to have induced voltages of a common polarity with respect to the coil end 42 of the control winding 24 and the coil end 100 of the primary winding 20. The control winding 24 and the timing stabilization winding 26 are arranged to have induced voltages of a common polarity with respect to the reference point 42. In a preferred embodiment, the control winding 24 and the timing stabilization winding 26 are bifilar wound; i.e. the windings are wound together but insulated from one another. Due to the timing stabilization winding 26, the voltage waveform 94 and the current 96 in the control winding 24 are substantially altered in phase and magnitude relative to the respective waveforms of FIG. 3.

The presence of the timing stabilization winding 26 results in an ignition timing characteristic curve 92 that is retarded at low engine RPM with respect to the timing characteristic curve 90 without the timing stabilization winding 26. Thus, the orientation of the flywheel 12 is modified to advance the timing characteristic curve to result in the curve 102 of FIG. 5. Thus, the index or timing reference point of the flywheel 12 in terms of angular revolution is modified to achieve the appropriate ignition timing. The ignition timing characteristic represented by the curve 102 is equal to that of the curve 90 at low engine RPM and remains substantially constant through high engine speeds.

Figure 6:
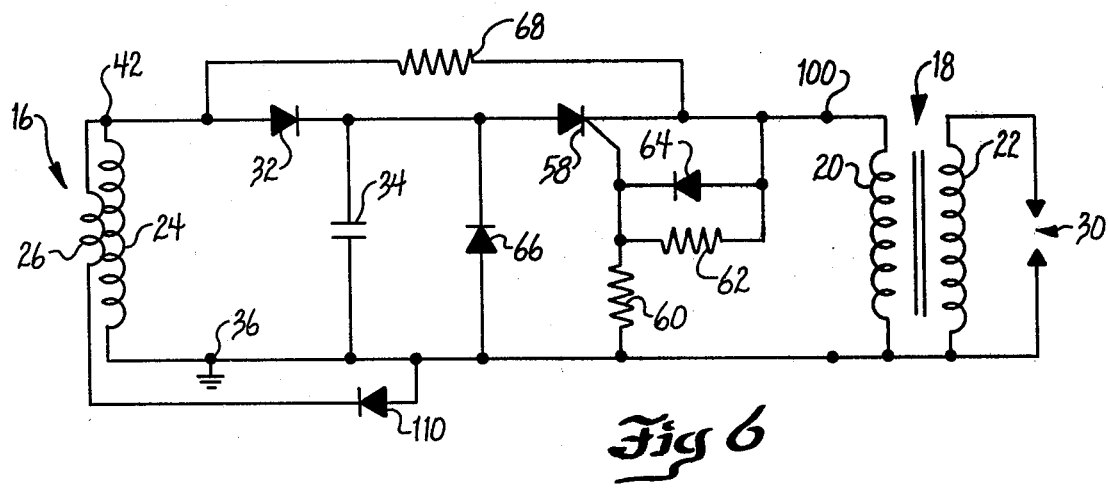
FIG. 6 is an electrical schematic diagram of a second embodiment of the capacitor discharge ignition system of the present invention as shown in FIG. 1.

Referring now to FIG. 6 and in accordance with further important aspects of the present invention, a second embodiment of the CDI system 10 of the present invention is illustrated with like reference numerals being utilized to represent identical components as shown in the embodiment of FIG. 2. In the embodiment of FIG. 6, the timing stabilization winding 26 is controlled by a diode 110 connected anode to cathode between the ground reference 36 and through the timing stabilization winding 26 to the reference point 42. In this arrangement, the diode 110 and the timing stabilization winding 26 are controlled by the voltage induced in the control winding 24. Thus, the embodiment of FIG. 6 does not require any control from the primary winding 20. As soon as the anode to cathode junction of the diode 110 is forward biased at approximately 0.7 volts, the timing stabilization winding 26 will be operative during each negative half cycle of the waveform 94.

In a specific embodiment of the CDI system 10 of the present invention, the following parameters have been found to be suitable although they are illustrative only and should not be interpreted in a limiting sense: control winding 24, 1800 turns; timing stabilization winding 26, 350 turns bifilar wound with the control winding 24; primary winding 20, 50 turns.

While there has been illustrated and described several embodiments of the present invention, it will be apparent that various changes and modifications thereof will occur to those skilled in the art. It is intended in the appended claims to cover all such changes and modifications as fall within the true spirit and scope of the present invention.

What is claimed and desired to be secured by Letters Patent of the United States is:

1. In a capacitor discharge ignition system for use with a rotating permanent magnet including two poles that is rotated over a path in synchronism with the operation of an engine, the combination of:

means positioned adjacent the path of the permanent magnet for generating a charging supply and for generating a triggering signal in response to induced voltages and currents resulting from the rotating permanent magnet, said generating means comprising a control winding having induced therein a voltage and current of a first polarity to generate said charging supply in response to the passage of a first pole of the magnet and having induced therein a voltage and current of opposite polarity to said first polarity to generate said triggering signal in response to passage of the second pole of said magnet;

storage means connected to said generating means and being charged in response to said charging supply;

ignition coil means for generating an ignition voltage;

means responsive to said triggering signal for controlling the discharge of said storage means into said ignition coil means; and means responsive to said rotating permanent magnet for stabilizing said triggering signal over a wide range of engine speeds, said stabilizing means being effective during the generation of said triggering signal and being inoperative during the generation of said charging supply, said stabilizing means comprising a stabilizing winding, one end of said stabilizing winding being connected to one end of said control winding, said connected coil ends of said stabilizing winding and said control winding being the winding ends having induced voltages of common polarity, said stabilizing means further comprising circuit means operative during the passage of said second magnet pole for connecting said stabilizing winding across said control winding such that said stabilizing winding and said control winding are in a series loop.

2. The capacitor discharge ignition system of claim 1 wherein said stabilizing winding is bifilar wound with said control winding.

3. The capacitor discharge ignition system of claim 1 wherein said circuit means comprises a diode connected between the other winding end of said control winding and the other winding end of said stabilizing winding.

4. The capacitor discharge ignition system of claim 1 wherein said circuit means comprises SCR control means having anode, cathode and control connections, said cathode being connected to the other winding end of said stabilizing winding, said anode being connected to the other winding end of said control winding, said ignition coil comprising a primary winding and a secondary winding, said control connection being connected to one end of said primary winding, the other end of said primary winding being connected to the other winding end of said control winding.

5. The capacitor discharge ignition system of claim 1 wherein said controlling means comprises SCR semiconductor means having anode, cathode and control connections, and said storage means comprises a capacitor, said anode being connected to one end of said capacitor, said cathode being connected to said ignition coil and said control connection being connected to said control winding.

6. The capacitor discharge ignition system of claim 5 wherein said storage means further comprises diode means connected between said one end of said control winding and said capacitor, said diode means being connected to pass current to charge said capacitor, said control connection of said SCR semiconductor means being connected to the other end of said control winding.

* * * * *